(No Model.)

J. RANCEVAN.
WHIFFLETREE HOOK.

No. 300,893. Patented June 24, 1884.

Attest
Walter Chamberlin
O. M. Hill

Inventor
John Rancevan
per Wm. Hubbell Fisher
Atty

N. PETERS, Photo-Lithographer, Washington, D. C.

UNITED STATES PATENT OFFICE.

JOHN RANCEVAN, OF CINCINNATI, OHIO, ASSIGNOR TO ELISHA ROBINSON, OF NEW YORK, N. Y.

WHIFFLETREE-HOOK.

SPECIFICATION forming part of Letters Patent No. 300,893, dated June 24, 1884.

Application filed January 28, 1884. (No model.)

*To all whom it may concern:*

Be it known that I, JOHN RANCEVAN, a resident of the city of Cincinnati, in the county of Hamilton and State of Ohio, have invented certain new and useful Improvements in Automatic Trace-Locks, of which the following is a specification.

The nature of my invention and its several features, and the various advantages arising from their use, conjointly or otherwise, will be apparent from the following description.

Figure 1:
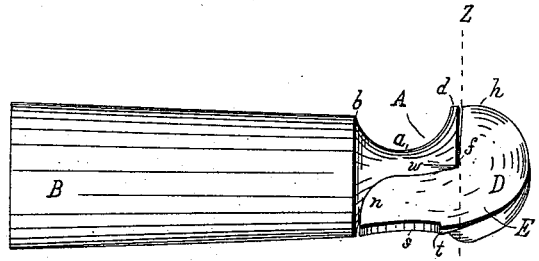
Figure 2:
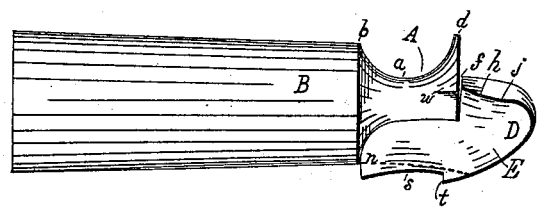
Figure 3:
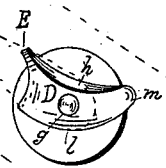
Figure 4:
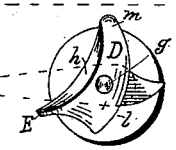
Figure 5:
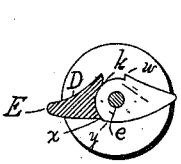
Figure 7:
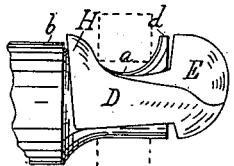
Figure 6:
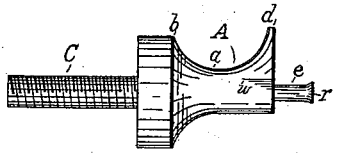
Figure 8:
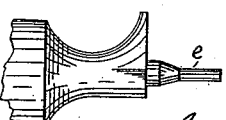

In the accompanying drawings, Figure 1 represents a top view of a device illustrating my invention, when the device is in position to receive the trace. Fig. 2 represents a top view of the device shown in Fig. 1, when the device is in a position in which a trace on the bearing will be securely locked in place. Fig. 3 represents an end elevation of the device in the same position as shown in Fig. 1, and looking from right to left in said Fig. 1, the rear portion of a trace being shown in dotted lines in the act of being slipped over the trace-lock and onto the trace-bearing. Fig. 4 represents an end elevation of the device in the same position as in Fig. 2, and looking from right to left in said figure, the rear portion of a trace being shown in dotted lines in place on the bearing and securely locked in position. Fig. 5 represents a view of that end of the trace-bearing piece which is next to the movable portion of said lock, and showing in end section the wing of the locking device, the section being taken at the dotted line *z z* of Fig. 1. Fig. 6 represents the bearing-piece of my trace-lock, and also shows its application as applied to what is known as a "threaded cockeye," for screwing into an ordinary whiffletree. Fig. 7 illustrates one of the various modes which can be employed, when found necessary, to prevent the locking-piece from rattling against its adjacent parts. Fig. 8 illustrates another of the modes which can, when desired, be employed to prevent rattling.

A indicates the trace-bearing piece. The bearing portion *a* of said piece is rounded. This bearing-piece is connected at its end *b* in any suitable manner and by any suitable connection to anything which the draft-animal is to draw or pull. Ordinarily the trace-lock is to be connected to the end of the whiffle- tree or single-tree, and it is preferably connected at its end *b* either to the usual thimble, ferrule, or socket, B, shown in Figs. 1, 2, 3, 4, and 5, and which is fitted over the end of the whiffletree and fastened thereto in the customary manner, or to the end of a screw-threaded cockeye, C, adapted to screw into and engage the thread of a female screw longitudinally located in the end of the whiffletree. The bearing-piece A is provided at its outer end with a lug or lateral projection, *d*, extending rearwardly.

To the free end of the bearing-piece A is pivotally connected a movable or locking piece, D. The preferred mode of pivotal connection of this lock-piece D to the bearing-piece A consists in providing the free end of the lock-piece with a centrally-located projecting pivot, *e*, the longitudinal axis of the pivot being parallel to or coincident with the axis of the bearing-piece *a*. The diameter of this pivot is preferably less than the thickness or diameter of the bearing portion *a* of piece A, so that there shall be present a suitable shoulder, *f*, on the bearing-piece A, against which the locking-piece, when on the pivot *e*, may bear, and by which it may be braced.

As before intimated, the locking-piece D has an opening or bearing-hole, *g*, and the pivot *e* passes through this bearing-hole, and the locking-piece turns on the pivot *e*. A suitable projection or head, *r*, on the outer or free end of the pivot outside of the locking-piece prevents the locking-piece from slipping off the pivot, and also holds the locking-piece against the shoulder *f*. The outward portion of the locking-piece is, when viewed in end elevation, preferably of a rounded concave form, *h*, as to its upper portion, and of a rounded convex form, *l*, below, the two surfaces *h* and *l* meeting each other at rear in a somewhat sharp edge, *m*. These two surfaces forwardly separate, and to the upper portion of the solid piece between them is connected the wing E of the locking-piece, said wing being hereinafter described. Viewed from above or below, the free or outer end or edge, *j*, of the locking-piece is curved in approximately the form of a semicircle. The outer end portion of the locking device is preferably rounded up from convex surface *l* to concave surface $h$, as shown. The wing E of the locking-piece extends along the bearing portion $a$ of the bearing-piece A, preferably the entire length of said bearing portion $a$, and when it does extend thus far its end $n$ will preferably be curved or shaped to fit the conformation of the shoulder of the part of the whiffletree, &c., to which the bearing-piece A is connected. That surface or edge of the wing which is next to the bearing portion $a$ preferably fits closely against the latter, and for that reason is of a rounded convex form, $k$, the better to fit the round of the bearing portion $a$. The position of the wing when the device is ready to receive the trace is such that the planes of its sides extend upwardly in a position inclined to the horizontal.

The outer edge, $s$, of the wing may be smooth and level, and the lock will still work well; but I prefer to form said edge as shown—viz., at or near the outside part of edge $s$ is located a lug, $t$, the inner face of said lug being preferably nearer to the end $b$ of the bearing portion $a$ than is the free end of the bearing-piece A, in order that the lug may the better engage the trace when the device is locked. The other end of edge $s$ may be raised or depressed, as shown in dotted lines in Fig. 2, or elevated, as shown in Figs. 1 and 2 in solid lines.

As before mentioned, the pivot $e$ is connected to bearing-piece A in any suitable manner. An economical mode of connecting the same consists in casting them together in one piece, or in casting the bearing-piece A around the pivot $e$. Where the ferrule B or cockeye C is employed, the bearing-piece A is preferably cast thereto. When desired, the end $r$ of the pivot may be formed after the manner of forming a rivet, after the locking device has been placed in position on the pivot.

To prevent the wing from rising up too high and moving rearward, I provide a suitable stop—as, for example, shoulder $w$ on the bearing-piece. It is desirable to prevent the wing when moved forward from falling too low, and for this purpose a suitable stop, $x$, is to be provided. In the present instance the forward portion of the bearing-piece is in cross-section elongated, as at $y$, Fig. 5, and as the locking device is moved forward the latter is stopped in its onward movement by the stop $y$, and the wing does not fall much, if any, below the horizontal.

The mode in which the foregoing device operates is as follows: The device is in the position shown in Figs. 1 and 3, the wing being inclined upward and the lug $d$ and point or lip $h$ coincide. The trace to be applied is now taken in hand and slipped onto the bearing-surface, the outward portion of the locking device passing through the slot of the trace. As soon as the bearing portion $a$ is within the slot of the trace, and the trace inside of the lug $d$ of the bearing-piece A, the operator lets go his hold on the trace, and the latter will then hold or assume a position in which the wing is horizontal, or nearly so. The wing being inside of the slot of the trace, as the trace assumes a position where its length is horizontal, or approximately so, the wing is moved to such a horizontal position, and the point $h$ has now assumed a vertical position and serves as an effectual and secure stop or guard to prevent the trace from slipping off the bearing portion or stem $a$. If now, through the agency of the movements of draft-animal, or for any reason whatsoever, the trace is slacked, its weight will always contribute to keep the wing down and the point or lip $h$ up, and thus secure the trace from coming off the bearing portion $a$. Of course, when the draft-animal is pulling on the trace, the trace is substantially horizontal, and the wing will be kept down and the point $h$ will be elevated, and the trace will be secured in position. When the trace is to be unfastened, the latter is lifted in front of the locking device, so that the wing shall be elevated; then the point $h$ will pass backward and out of the way, and the length of the locking device will substantially coincide with the length of the slot in the trace, and the latter can be readily slipped off the bearing-piece A and disconnected altogether from it and the locking device.

As to use, one of the locking devices is to be used with one of a pair of traces, and another of the locking devices is to be used with the other trace of said pair. Ordinarily when the wing is moved forward and down, a stop, as $y$, being employed on the bearing $a$, the wing E will bind on the bearing $a$ sufficiently to prevent the said wing from rattling on its pivot-bearing and against the end of the bearing-piece $a$. Should, however, the wing rattle, any suitable mode of construction or suitable means are to be employed to obviate the rattling. A desirable mode of preventing such rattling is as follows: The wing E is made thick through from side to side, and the upper side (and also the lower when desired) is provided at or near the end $b$ of the bearing $a$ with an elevation or lug, H. The inner side of this lug H and the inner side of lug $d$, in this instance elevated, as shown in Fig. 7, approach each other as they descend, for reasons hereinafter apparent. Lug H projects far enough toward the outer or free end of the bearing, so that when a trace is placed so as to surround the bearing it shall, by its weight, not quite reach the upper side of bearing $a$, but be wedged in between the lug $d$ of the bearing-piece A, and the elevation or lug H of the wing E. Such a position of the trace will tend to constantly draw the locking device D toward and keep it pressed against the end of the bearing-piece $a$, and thus prevent any rattling of the locking device against the bearing-piece. Furthermore, pivot $e$ may be made cone-shaped, and the hole in the locking device which is to receive the pivot may be made cone-shaped to fit the cone-shaped bearing, and in diameter preferably everywhere respectively a trifle smaller than is the cone of the pivot in diameter, the straight or cylindrical part of the pivot and of the hole excepted. (See Fig. 7.) Thus, when the trace is in position on the bearing $a$ the locking device will be drawn toward the end of the bearing-piece and will become temporarily tightly wedged on the conical bearing, and thus all rattling will be prevented. Of course, upon the rear side of the bearing $a$ the trace is always free to bear without interruption when the draft-animal is drawing upon the traces.

While the various features of my invention are preferably employed together, one or more of said features may be employed without the remainder, and may, in so far as applicable, be applied not only to trace-fasteners other than those herein described, but be applied in fastening together other portions of harness, and also be employed in fastening together many other kinds of useful articles.

Having thus described my invention, what I claim as new, and desire to secure by Letters Patent, is—

1. In a trace-fastening, a locking-piece pivoted to a stem having a lug, and provided with a lip and a wing arranged at an angle, substantially as described, so that the lip may be brought to coincide with the lug to permit the trace to be put upon the stem with the wing in the eye, and so that as the trace is drawn to a horizontal position the lip will be carried from the lug across and outside of the eye of the trace, substantially as described.

2. A trace-fastening provided with a stem to receive the trace and a lateral lug in line with the eye of the horizontal trace, and a locking-piece pivoted at the end of the stem, having a lip which may be brought to coincide with the lug on the stem to permit the trace to be put on the latter, and a wing to fit the eye of the trace arranged at about right angles to the lug on the locking-piece, substantially as described.

3. A trace-fastening consisting of a stem, $a$, having a lug, $d$, and a locking-piece, D, pivoted at the end of the stem $a$, and having a lip, $h$, and wing E, with stops to prevent the locking-piece from turning back after the lugs and lip are brought to coincide, substantially as described.

4. The stem $a$, terminating in a pin, $e$, having a conical bearing, and the locking-piece having a conical socket fitted to said bearing and provided with a lug, H, substantially as and for the purpose described.

JOHN RANCEVAN.

Witnesses:
JNO. W. STREHLI,
W. H. MAXWELL.

It is hereby certified that in Letters Patent No. 300,893, granted June 24, 1884, upon the application of John Rancevau, of Cincinnati, Ohio, for an improvement in "Whiffle-tree-Hooks," the name of the patentee was erroneously written and printed "John Rancevan;" and that the proper correction has been made in the files and records pertaining to the case in the Patent Office, and should be read in the Letters Patent to make it conform thereto.

Signed, countersigned, and sealed this 1st day of July, A. D. 1884.

[SEAL.]

M. L. JOSLYN,
*Acting Secretary of the Interior.*

Countersigned:
    BENJ. BUTTERWORTH,
        *Commissioner of Patents.*